N. L. GOODWIN.
SELF LOADING CART.
APPLICATION FILED JUNE 27, 1910.
987,621.
Patented Mar. 21, 1911.
2 SHEETS—SHEET 2.
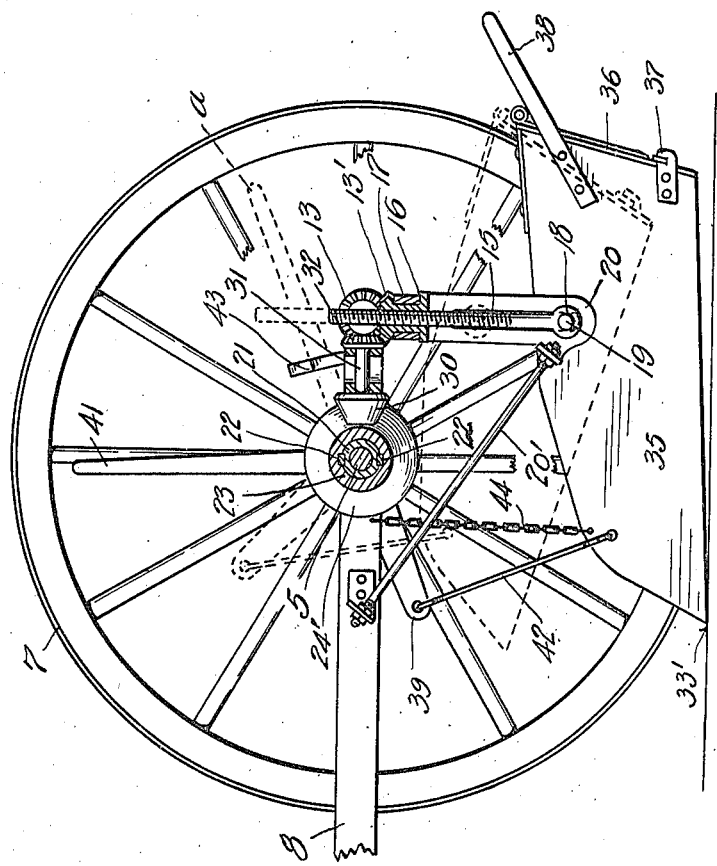
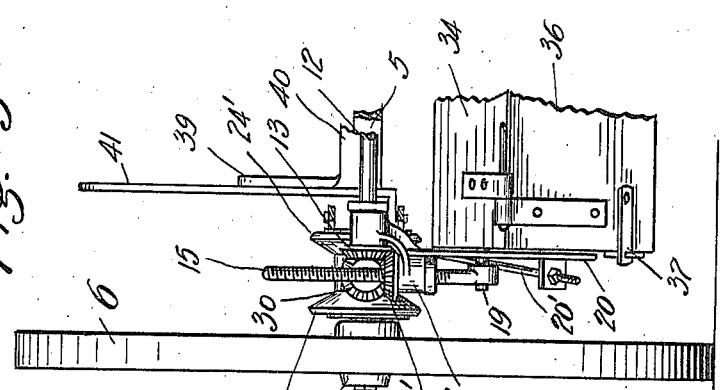
Witnesses
H. Barnes
E. Peterson
Inventor
Norman L. Goodwin
By his Attorney
Pierre Barnes

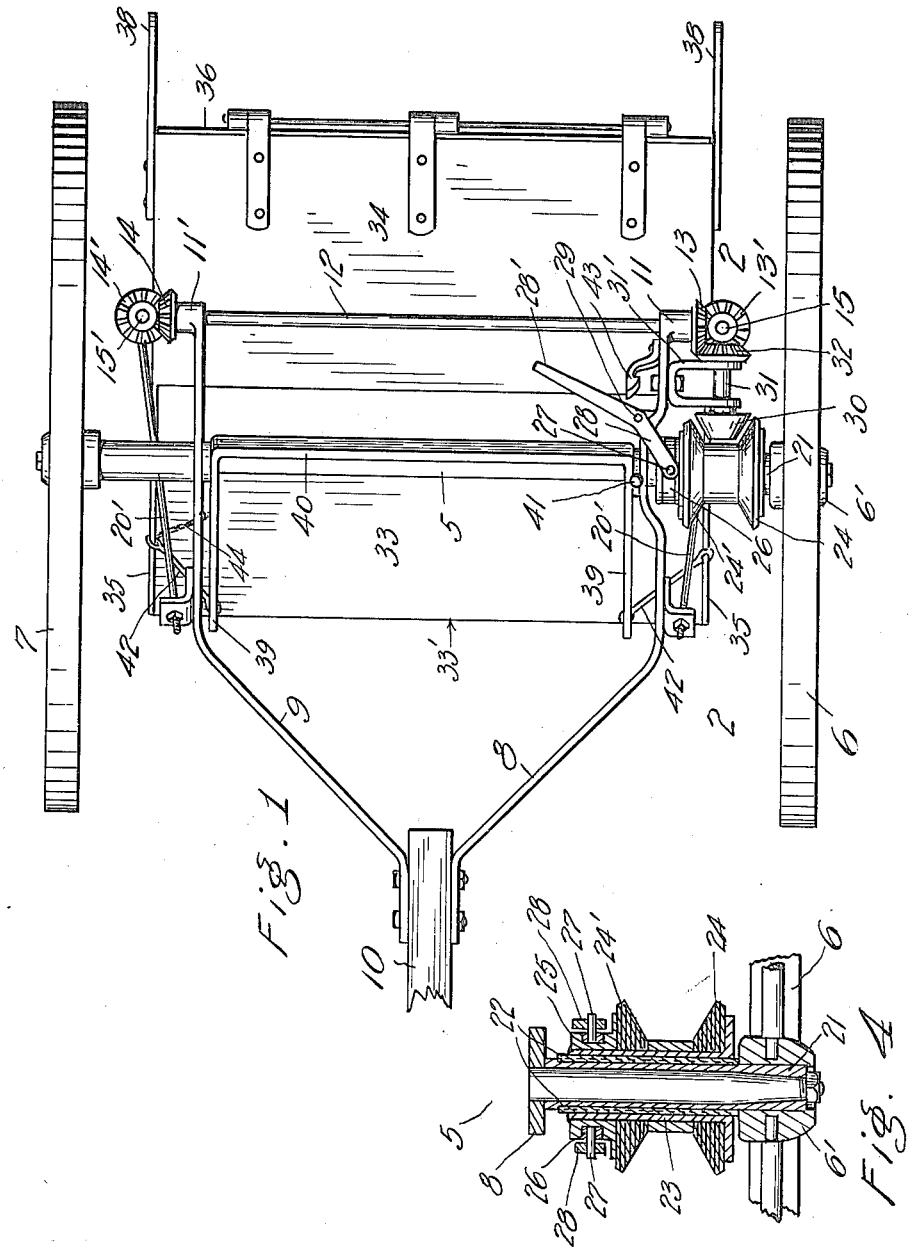

UNITED STATES PATENT OFFICE.

NORMAN L. GOODWIN, OF TACOMA, WASHINGTON.

SELF-LOADING CART.

987,621.  Specification of Letters Patent.  Patented Mar. 21, 1911.

Application filed June 27, 1910. Serial No. 569,215.

*To all whom it may concern:*

Be it known that I, NORMAN L. GOODWIN, a citizen of the United States, residing at Tacoma, in the county of Pierce and State of Washington, have invented certain new and useful Improvements in Self-Loading Carts, of which the following is a specification.

This invention relates to scrapers which are utilized for excavating and transporting dirt in grading or analogous operations.

The object of the invention is the improvements in this class of devices with a view to render them more efficient and expeditious in the performance of work and more convenient to operate.

The invention consists in a box-shaped scraper which is tiltably supported from a wheeled vehicle, and arranged to be raised bodily from the ground subsequent to being loaded to enable the scraper being moved without contacting with the ground and which is adapted to dump its load from the rear end of the scraper as will be hereinafter more fully described.

In the accompanying drawings, where similar numerals of reference indicate like parts in the various views,—Figure 1 is a plan view of a wheeled-scraper embodying my invention. Fig. 2 is a longitudinal section taken through 2—2 of Fig. 1. Fig. 3 is a rear elevation of a portion of the machine. Fig. 4 is a detail sectional view illustrating the parts of the scraper-hoisting devices with the associated operating wheel.

The reference numeral 5 designates an axle for the wheels 6 and 7. Rigidly secured to said axle are spaced frame members 8 and 9 which are turned inwardly for connection with the pole 10 to which the animals for drawing the scraper are attached. Said frame members project to the rear of the axle and are provided with journal boxes 11 and 11′ for a transversely arranged shaft 12. The opposite ends of the shaft are equipped with bevel gears 13 and 14 which are in continuous mesh with gears 13′ and 14′ having a threaded bore extending through each to respectively accommodate the right and left hand threads provided upon upright bars 15 and 15′.

The bosses of the last mentioned gears are each provided with an annular groove such as 16, Fig. 2, for a journal box 17 which is rigidly connected with the adjacent frame member. At their lower ends each of said bars are provided with an eye 18 to receive a trunnion 19 projecting from the adjacent side of the scraper proper.

Depending from the boxes, which are rigid with the respective frame members, are limbs, such as 20, which are slotted to furnish guides for said trunnions. Diagonal stays 20′ connecting the frame members with said limbs serve to secure the latter. Fixedly secured to the hub 6′ of wheel 6 is a bushing 21 of a length to extend for a distance toward the middle of the axle.

As shown in Fig. 4, there is secured by splines 22 to the bushing, a sleeve 23 which carries two reversely arranged friction elements 24 and 24′ and also a peripherally grooved collar 25. Within the collar groove is a ring 26 provided with horns 27 which engage in the apertured branches 28 of a lever 28′ (Fig. 1) fulcrumed to a pin 29 secured to the adjacent frame member 8. Said lever is employed for giving endwise movement to the above mentioned friction elements for selectively engaging one or the other thereof with a frictional element 30 which is mounted upon one end of a longitudinal shaft 31 rotatable in bracket support, as 31′. Provided at the other end of the shaft is a bevel gear 32 in mesh with the bevel gear 13 to impart rotary motion to the shaft 12, as required.

The scraper proper is of a box-shaped form being comprised of a bottom plate 33, a top plate 34 and side plates 35 to which the aforesaid trunnions are secured. The front of the scraper is open while at the rear it is provided with a hinged door 36 which may be secured in closed condition by latch devices 37. Provided at each side of the scraper are rearwardly extending handle-arms 38.

39 represent complementary lever-arms which are fulcrumed to and extend forwardly from the axle 5.

The lever arms are integrally connected by a transverse bar 40 and are operated by the lever arm 41 which is rigidly secured to the bar 40 or with one of the arms 39. Links 42 connect the latter with the scraper sides 35 in proximity to the forward ends of the same and serve to support the forward end of the scraper when the lever arm 41 is swung rearwardly into the position in which it is indicated by broken lines *a*, Fig. 2, whereat the lever is caught by a hook 43 attached to the frame.

44 represents chains connecting the frame with the scraper to limit the downward tilting of the forward edge, or lip, 33' of the scraper plate 33 when dirt is being scooped by the scraper in its forward travel.

The operation of the invention is as follows: When the machine is drawn forward by the horses, the traction wheels are caused to roll upon the ground, and, in so doing, the rotary motion of the wheel 6 is transmitted through the medium of the bushing 21 and sleeve 23 to the friction elements 24 and 24'. By means of the forked lever 28' the sleeve 23 is shifted to thrust the friction element 24 into couple with the element 30 whence the shaft 31 is accordingly driven to effect the rotation of the shaft 12 by means of the pair of gears 32 and 13 which operatively connect the two shafts. The shaft 12, through the agency of the gears 13 and 14, effects the rotation of the gears 13' and 14' which, acting as nuts, cause the threaded rods 15 to be moved down with a consequent lowering of the scraper which is suspended therefrom. When the scraper is sufficiently depressed, the operator releases the lever 28' and manipulates the scraper by means of the handle-arms 38 to properly present the lip 33' of the scraper into position such that the continued forward movement of the machine will result in the scooping of a load of dirt into the scraper. The load thus being attained, the operator pulls the arm 41 into the position indicated by broken lines $a$ in Fig. 2 when the arms 39 will be tilted upwardly together with the front end of the scraper through the medium of the links 42. Meanwhile, the operator swerves the lever 28' to bring the friction element 24' into couple with the element 30 resulting in the turning of the gears 13' and 14 to elevate the rods 15 and thereby acting in conjunction with the raising of the front end of the scraper performed through the office of the lever-arm 41, to place the scraper in the position in which it is represented in Fig. 3, and denoted by broken lines $b$ in Fig. 2. Thus disposed, the front end of the scraper is tilted up while the rear end is elevated from the ground sufficiently far to allow of its being carried without encountering objects upon the road surface to the place where the load is to be deposited. By unlatching the door the load is discharged from the rear end of the scraper.

The convenience and economy in handling dirt by the afore explained devices will be appreciated by contractors and others having experience in this character of operations.

I claim as my invention,—

1. In apparatus of the class described, the combination with an axle, a frame secured to the axle and wheels journaled upon the axle ends, vertically movable rods, a scraper tiltably connected to said rods, mechanical connections between one of said wheels and said rods for effecting the raising and lowering of the rods with corresponding movements of the scraper, and means for tilting the forward end of the scraper downwardly for loading purposes and upwardly to enable the load to be discharged from the rear end of the scraper.

2. In apparatus of the class described, the combination with the machine frame, traction wheels connected with the frame, and a scraper provided with a hinged door at its rear end, of means arranged to be operated by one of said wheels whereby the scraper is selectively raised or lowered with respect to the frame, and means to tilt the scraper for loading or discharging purposes.

3. The combination with the wheels, an axle therefor, and a frame provided with a pole for attaching the draft animals thereto, of a box-shaped scraper, a hinged door at the back of the scraper, elevating devices suspended from said frame and engaging trunnions provided upon the opposite sides of the scraper, and means operated by one of said wheels whereby the scraper may be selectively raised or lowered through the medium of said elevating devices.

4. In apparatus of the class described, the combination with the wheels, an axle therefor, and a frame provided with a pole for attaching the draft animals thereto, of a box-shaped scraper, a hinged door at the back of the scraper, elevating devices suspended from said frame and engaging trunnions provided upon the opposite sides of the scraper, means operated by one of said wheels whereby the scraper may be selectively raised or lowered through the medium of said elevating devices, and lever controller connections for tilting upwardly the front end of the scraper.

5. In apparatus of the class described, the combination with a scraper body provided with a hinged door at the back thereof, a frame including a pair of wheels from which said scraper body is suspended, connections between said frame and said scraper affording selective vertical movements of the latter, and means to tilt upwardly the front end of the scraper.

NORMAN L. GOODWIN.

Witnesses:
PIERRE BARNES,
H. BARNES.